UNITED STATES PATENT OFFICE.

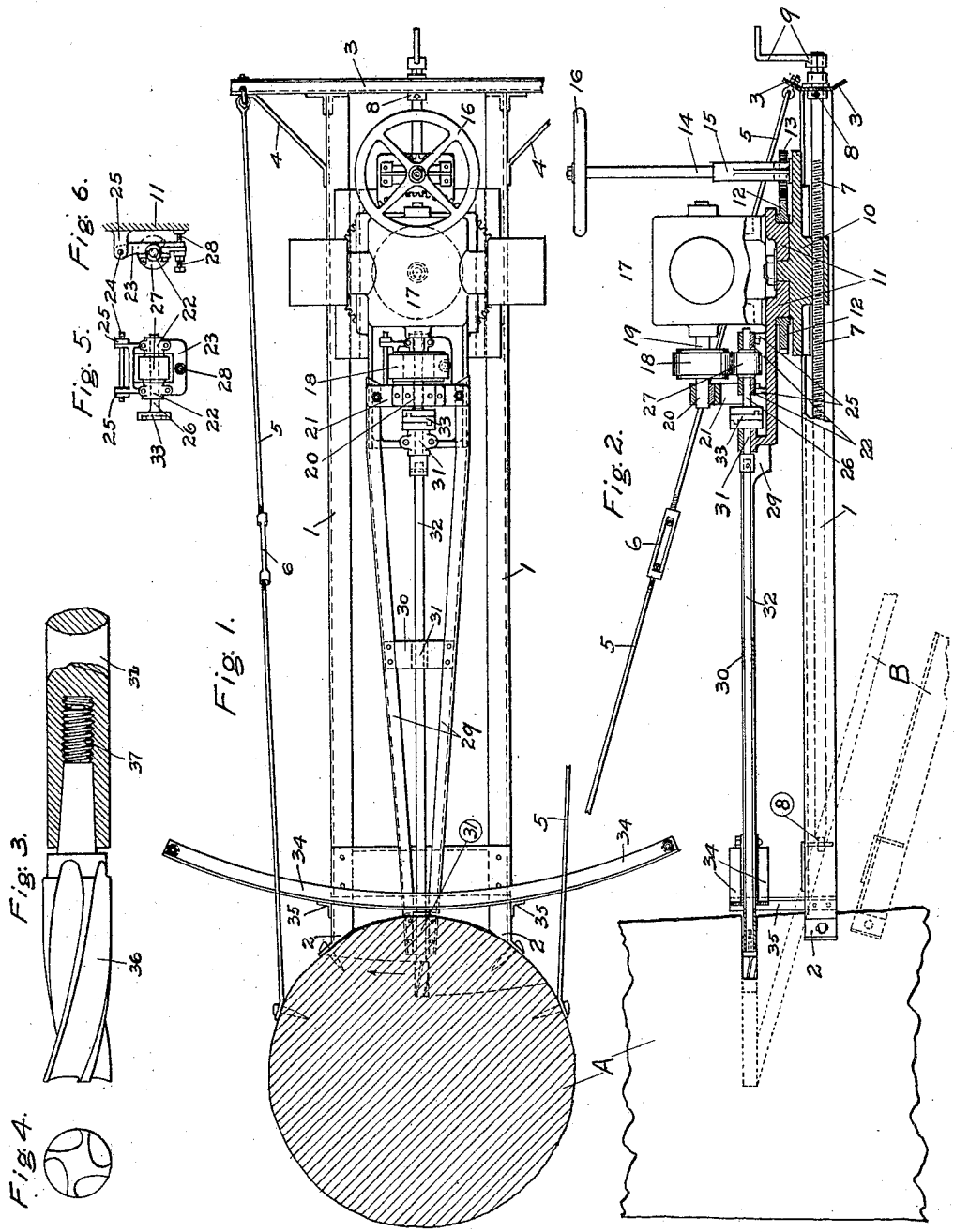

PIERCE X. JOHNSON, OF PORTLAND, OREGON, ASSIGNOR TO TREE FALLER & CUTTER CO., A CORPORATION OF OREGON.

TREE-FELLER.

1,163,155. Specification of Letters Patent. Patented Dec. 7, 1915.

Application filed January 25, 1913. Serial No. 744,161.

*To all whom it may concern:*

Be it known that I, PIERCE X. JOHNSON, a citizen of the United States, residing in the city of Portland, county of Multnomah, and State of Oregon, have invented certain new and useful Improvements in Tree-Fellers, of which the following is a specification.

My invention relates to tree fellers, and more particularly to certain improvements in the type of tree fellers shown and described in my pending application, filed December 2, 1911, under Serial No. 663,647, and which improvements are the results of experiments made in connection with the development and perfection of a machine of the character therein referred to.

With this invention for felling trees I accomplish the result in a manner very different from anything shown in the art, namely, by means of a small cutting tool or bit, mounted upon the end of a revolving operating shaft, which is pivotally mounted at its opposite end, whereby to be oscillated back and forth laterally, and adapted to be advanced longitudinally after each oscillation, said cutting tool being driven at a high rate of speed, whereby it cuts its way through a tree as it is moved laterally back and forth in opposite directions and in successively advanced positions.

The embodiment of the invention which I have shown on the accompanying sheet of drawings, and will now describe, is a practical machine which has been worked out as a result of many experiments and much expense, and illustrates a tree cutting device which is simple and efficient, and which is so small that two men can easily pick it up and carry it by hand from place to place.

In the drawings,—Figure 1 is a top plan view of a practical embodiment of the invention; Fig. 2 is a side elevation thereof, with parts in section; Fig. 3 is a view of the cutting tool or bit, with a portion of the operating shaft shown in section; Fig. 4 is an end view of the cutting tool; Fig. 5 shows a plan view of a detail; and Fig. 6 shows an end view thereof.

Referring to the drawings, the device is mounted upon a supporting or carrying frame 1, preferably made of angle irons, with attaching feet, as 2—2, at its forward end, adapted to be spiked to the tree to be cut, and with a cross bar 3 at its rearward end, suitably braced, as at 4—4, and adapted to have attached thereto, either above or below, brace or supporting rods, as 5—5, for holding the frame rigidly in an operating position upon the tree. Said rods are preferably provided with buckles, as 6—6, for such adjustments as may be needed in making the frame rigid in its operating position. Rotatably mounted in said frame 1, longitudinally thereof, is an adjustment screw 7, with bearings at its opposite ends in the frame 1, as at 8—8, and provided at its rearward end with an operating crank 9, whereby it can be manually operated for a purpose hereinafter referred to. Movably mounted upon said frame 1, is a sliding base or block 10, through a portion of which said adjustment screw 7 has an operating screw engagement, as indicated, Fig. 2. By turning the crank 9, upon the rear end of said adjustment screw 7, said sliding base or block 10 can be mechanically moved longitudinally of said carrying frame 1. Revolubly mounted upon said sliding base or block 10 is a plate or turn-table 11, provided around its under side with gear teeth, as at 12, which mesh with a gear 13, mounted upon the lower end of an operating rod or shaft 14, rotatably supported in the standard 15, upon said sliding block 10, and carrying at its upper end a hand wheel 16, by means of which said revoluble plate or turn table 11 can be turned in either direction at will. Mounted upon said turn table or plate 11 is a gas engine 17, of the double cylinder type, with a friction drive wheel 18 upon its crank shaft 19, which shaft 19 is supported at its outer end in a suitable bearing 20, in an arch or bracket 21, mounted upon the forward end or part of the revolving plate or turn table 11. Mounted in suitable bearings 22—22, in a yoke 23, hinged at 24, to suitable lugs 25—25 upon the turn table 11, is a short driving shaft 26, which carries a small friction wheel 27, adapted to be adjusted into frictional driving engagement with the friction wheel 18. This adjustment is accomplished by means of a set screw 28, Figs. 5 and 6, in the hinged yoke 23, whereby said small friction wheel can be moved into and out of frictional engagement with the friction wheel 18 at will by the turning of said set screw 28 in one direction or the other.

Mounted upon the forward end of said revolving plate or turn table 11, is a tapering frame 29, suitably strengthened, as at 30, and having rotatably mounted therein, in suitable bearings, as at 31—31, an operating shaft 32, which is connected at its rearward end, by means of a well known Oldham coupling 33, to the short driving shaft 26. By means of an adjustable coupling, said operating shaft can be driven from the short driving shaft 26, even though in the adjustment of the small friction wheel 27, the shaft 26 is moved out of alinement with the operating shaft 32, said shafts constituting, in effect, a two-part operating shaft with an adjustable coupling therebetween. At its forward end, said operating shaft 32 is supported in a suitable bearing in the end of the operating frame 29, as at (31), the forward end of said operating frame being supported movably between the members of a curved angle iron guide frame 34, mounted upon the forward end of the main carrying frame 1, by means of supporting legs 35.

Mounted in the forward end of the operating shaft 32, which projects slightly beyond the forward end of the operating frame 29, is a cutting tool or bit 36, the shank of which is preferably of tapering form and is provided with screw threads, as at 37, and adapted to be screwed into the end of the operating shaft 32, internally threaded for that purpose, as clearly indicated in Fig. 3. Said cutting tool or bit 36, is formed with its cutting knives or blades extending in a slightly spiraled direction lengthwise thereof, as illustrated, and are hollow ground, as clearly indicated in the side and end views thereof, Figs. 3 and 4.

The operation of the device may be briefly described as follows:—The carrying frame 1 is spiked to a tree, as A, at its forward end, as at 2—2, with the supporting or brace rods 5—5, which run to the rear end thereof, spiked to the tree at a distance above, whereby to support the device upon the tree at any desired height. The sliding plate or block 11, carrying the power-furnishing mechanism, is moved to the rear end of the frame 1 by means of the adjusting screw 7 and the crank 9. The engine is started, and the operator, by means of the hand wheel 16, turns the revolving plate or turn table first in one direction and then in the other and thereby moves the operating frame 29 laterally in opposite directions, as from one side to the other, and thereby moves the cutting tool or bit 36, upon the forward end of the operating shaft 32, into cutting engagement with the tree and it cuts its way through the tree as it is moved thus laterally from one side to the other. After each lateral movement, the operator turns the adjusting screw by means of the crank 9, and moves the sliding base or block 10 forwardly for the length of the cutting tool or bit, and then by means of the hand wheel 16, swings the operating frame to the opposite side, in the cut first made, thereby cutting another swath through the tree, as indicated by the dotted lines, in the tree A, Fig. 1. The cutting tool or bit is larger in diameter than the thickness of the operating frame 29 and the operating shaft 32, so that both the frame and the shaft moves freely within the cut made by the tool as it is forced laterally through the tree in successively advanced positions.

With my invention it is possible to make an under-cut by dropping the rear end of the device downwardly, in the manner indicated by the fragmentary dotted line position, shown in Fig. 2, at B. By making this cut first, and then adjusting the machine to a horizontal position, as shown in full lines, Fig. 2, a wedge shaped piece or block is cut out from the stump part of the tree instead of from the tree itself, leaving the butt end of the tree square, and at the same time providing an inclined supporting surface on the stump for the tree to rest upon as it falls.

The invention, therefore, broadly considered, comprises an operating shaft provided at its forward end with a cutting tool or bit of greater diameter than said shaft, whereby the shaft can be moved freely in the cut made by said tool, with power-furnishing mechanism for driving said operating shaft and tool, with mechanism for oscillating said shaft laterally and for successively moving said shaft and power-furnishing mechanism forwardly after each oscillation thereof, whereby said cutting tool cuts away the tree as it is moved sidewise thereagainst in successively advanced positions.

I am aware that changes can be made in the embodiment of the invention here shown and described without departing from the spirit thereof, and I do not, therefore, limit the invention to the specific form thereof here shown and described for purposes of illustration, except as I may be limited by the hereto appended claims, broadly interpreted.

I claim:

1. In a tree feller, in combination, a carrying frame, a sliding element mounted thereupon with means for moving the same, a revoluble element mounted upon said sliding element, power-furnishing mechanism upon said revoluble element, an operating shaft connected with said power-furnishing mechanism at its rear end, with its free end extended forwardly and adapted to be moved laterally in either direction with the movement of said revoluble element, and a cutting tool or bit upon the free end of said operating shaft and adapted to cut a swath through a tree when moved laterally thereagainst.

2. In a tree feller, in combination, a carrying frame, a sliding element mounted thereupon, mechanism for moving said sliding element at will in opposite directions, a revoluble element mounted upon said sliding element, power-furnishing mechanism upon said revoluble element, a two-part operating shaft with an adjustable coupling therefor, connected at one end with said power-furnishing mechanism and having its forward end free to be moved laterally in either direction with the movement of said revoluble element, and a cutting tool or bit upon the free end of said operating shaft and adapted to cut a swath through a tree when moved laterally thereagainst.

3. In a tree feller of the character referred to, in combination, a carrying frame adapted to be secured to a tree at its forward end, a sliding element mounted thereupon with an adjustment screw for moving the same longitudinally of said carrying frame, a turn-table mounted upon said sliding element, power-furnishing mechanism upon said turn table, an operating shaft connected to and driven from said power-furnishing mechanism and having its end extended forwardly and free to oscillate with the revolving movement of said turn-table, a cutting tool or bit upon the end of said operating shaft, and operating mechanism for manually oscillating said operating shaft laterally in opposite directions with the revoluble movement of said turn-table.

4. In a tree feller, in combination with a carrying frame and power furnishing mechanism, of an oscillating frame movably mounted thereupon, an operating shaft revolubly mounted in said oscillating frame and driven from said power - furnishing mechanism, and a cutting tool of greater diameter than the thickness of said oscillating frame and shaft mounted upon the end of said shaft and adapted to cut its way through said tree when moved laterally in opposite directions and at successively advanced positions, said oscillating frame being adapted to move freely in the cut made by said cutting tool.

5. In a tree feller of the character referred to, in combination with a carrying frame and power furnishing mechanism, of an oscillating frame movably mounted thereupon, an operating shaft revolubly mounted in said oscillating frame and having driving connections with said power - furnishing mechanism, a cutting tool or bit of greater diameter than said frame and shaft, mounted in the end of said shaft and adapted to cut through a tree against which it is moved sidewise, whereby said frame and shaft can be moved freely within said cut, and mechanism for successively advancing said frame, shaft and cutter after each oscillation, substantially as described.

6. In a tree feller of the character referred to, an oscillating frame mounted to turn upon a vertical axis and of thin vertical construction, an operating shaft revolubly mounted in said frame, a cutting tool mounted in the end of said shaft and of greater diameter than the thickness of said frame, whereby to cut a swath through which said frame can oscillate, and power-furnishing mechanism for driving said shaft and cutting tool.

7. In a tree feller of the character referred to, a carrying frame, an oscillating frame of thin vertical form movably mounted thereupon, an operating shaft revolubly mounted in said oscillating frame, power-furnishing mechanism mounted to move with said frame and having driving connection with said shaft, and a cutting tool of greater diameter than the thickness of said frame vertically and of the diameter of said shaft, whereby said shaft and frame will move freely through the cut made by said cutting tool.

8. In a tree feller of the character referred to, in combination, a carrying frame, an oscillating frame slidably mounted thereon and adapted to be oscillated laterally, mechanism for moving said oscillating frame longitudinally of said carrying frame, an operating shaft revolubly mounted in said oscillating frame and projecting therefrom, a cutting tool or bit mounted in the end of said shaft and being of greater diameter than said shaft and the thickness of said oscillating frame, whereby said frame and shaft can be moved freely in the cut made thereby, and power-furnishing mechanism for driving said operating shaft.

9. In a tree feller of the character referred to, in combination, a carrying frame, an oscillating frame slidably mounted upon said carrying frame, mechanism for moving said oscillating frame upon said carrying frame, mechanism for oscillating said oscillating frame, an operating shaft revolubly mounted in said oscillating frame, power-furnishing mechanism movably supported with said oscillating frame and having direct driving connection with said shaft, and a cutting tool or bit mounted upon the end of said shaft at the end of said oscillating frame and being of greater diameter than the thickness of said frame, whereby said oscillating frame can be moved laterally in the cut made by said cutting tool or bit.

10. In a tree cutting device, in combination, a supporting or carrying frame, a sliding element adapted to be moved bodily thereon with mechanism for moving the same, power-furnishing mechanism mounted upon said sliding element, an operating shaft operatively connected with said power-furnishing mechanism and projecting forwardly therefrom, said power-furnishing mechanism and shaft adapted to be oscillated about a vertical axis, and a cutting tool on the end of said shaft and of greater diameter than said shaft, whereby said shaft can move freely in the cut by said cutting tool as it is moved in opposite directions laterally and in successively advanced positions into said tree.

11. In a tree feller, in combination, a carrying frame, a sliding element mounted thereupon with mechanism for moving the same bodily in opposite directions, a revoluble element mounted upon said sliding element and moving therewith, power-furnishing mechanism mounted upon said revoluble element, an oscillating frame projecting forwardly from said revoluble element and movable therewith, an operating shaft revolubly mounted in said oscillating frame and having driving connections with said power-furnishing mechanism, a cutting tool or bit mounted on the end of said shaft at the end of said oscillating frame, said tool being of greater diameter or thickness than the thickness of said oscillating frame and shaft, whereby they can be oscillated freely in the cut made by said tool, and mechanism for oscillating said revoluble element, power-furnishing mechanism, frame, shaft and cutting tool laterally, substantially as and for the purpose described.

12. A tree feller of the character described, comprising in combination, power furnishing mechanism, an oscillating frame, an operating shaft rotatably mounted in said frame and driven by said power-furnishing mechanism, a cutting tool mounted at the end of said shaft and having a diameter larger than the diameter of said shaft and the thickness of said oscillating frame, said cutting tool being adapted to cut its way through a tree as moved laterally thereagainst, and means for oscillating said frame and operating shaft and for advancing them longitudinally, substantially as described.

Signed at Portland, Oregon, this 17th day of January, 1913.

PIERCE X. JOHNSON.

In presence of—
R. B. FRENCH,
WARREN P. SMITH.